(12) United States Patent
Liu et al.

(10) Patent No.: US 12,088,622 B2
(45) Date of Patent: Sep. 10, 2024

(54) METHOD AND APPARATUS FOR DEFENDING AGAINST CYBER ATTACKS, RECEIVING DEVICE AND COMPUTER STORAGE MEDIUM

(71) Applicant: ZTE CORPORATION, Guangdong (CN)

(72) Inventors: Cangming Liu, Guangdong (CN); Xianjin Hong, Guangdong (CN)

(73) Assignee: XI'AN ZHONGXING NEW SOFTWARE CO. LTD., Shaanxi (CN)

( * ) Notice: Subject to any disclaimer, the term of this patent is extended or adjusted under 35 U.S.C. 154(b) by 306 days.

(21) Appl. No.: 17/622,860

(22) PCT Filed: Apr. 7, 2020

(86) PCT No.: PCT/CN2020/083583
§ 371 (c)(1),
(2) Date: Dec. 26, 2021

(87) PCT Pub. No.: WO2020/258980
PCT Pub. Date: Dec. 30, 2020

(65) Prior Publication Data
US 2022/0263859 A1    Aug. 18, 2022

(30) Foreign Application Priority Data

Jun. 26, 2019  (CN) .......................... 201910563848.8

(51) Int. Cl.
*G06F 21/00*   (2013.01)
*H04L 9/40*    (2022.01)

(52) U.S. Cl.
CPC ...... *H04L 63/1441* (2013.01); *H04L 63/0853* (2013.01); *H04L 63/1416* (2013.01)

(58) Field of Classification Search
CPC ............. H04L 63/1441; H04L 63/0853; H04L 63/1416; H04L 12/2859; H04L 12/287; H04L 12/4641
See application file for complete search history.

(56) References Cited

U.S. PATENT DOCUMENTS

| | | | |
|---|---|---|---|
| 2010/0122330 A1 | 5/2010 | McMillan et al. | |
| 2016/0140344 A1* | 5/2016 | Sato | G06F 21/577 726/22 |
| 2016/0226893 A1* | 8/2016 | Warikoo | H04L 63/1433 |

FOREIGN PATENT DOCUMENTS

| | | |
|---|---|---|
| CN | 101136747 A | 3/2008 |
| CN | 103684792 A | 3/2014 |

(Continued)

OTHER PUBLICATIONS

ZTE Corporation, International Search Report with English Translation, PCT/CN2020/083583, Jun. 24, 2020, 6 pgs.

*Primary Examiner* — Ghazal B Shehni
(74) *Attorney, Agent, or Firm* — Dority & Manning, P.A.

(57) ABSTRACT

Embodiments of the present disclosure provide a method and system for defending against cyber-attacks, and a computer storage medium. An apparatus for defending against cyber-attacks randomly generates a new keyword. The apparatus for defending against cyber-attacks transmits the new keyword to a transmitting device and a receiving device, respectively. The receiving device updates a keyword set of the receiving device to include the new keyword, acquires a keyword carried in a communication message transmitted by the transmitting device, and determines whether the communication message is a cyber-attack message according to the keyword carried and the keyword set. The receiving device discards the communication message in response to the communication message being determined to be a cyber-attack message.

18 Claims, 6 Drawing Sheets

(56) References Cited

FOREIGN PATENT DOCUMENTS

| CN | 104333562 A | 2/2015 |
| CN | 106713061 A | 5/2017 |
| CN | 107800668 A | 3/2018 |

\* cited by examiner

METHOD AND APPARATUS FOR DEFENDING AGAINST CYBER ATTACKS, RECEIVING DEVICE AND COMPUTER STORAGE MEDIUM

CROSS REFERENCE TO RELATED APPLICATIONS

The present application is a United States National Stage Application filed under 35 U.S.C. § 371 of PCT Patent Application Serial No. PCT/CN2020/083583, filed Apr. 7, 2020, which claims priority to Chinese patent application No. 201910563848.8, filed on Jun. 26, 2019, each of which is incorporated by reference herein in its entirety.

TECHNICAL FIELD

The present application is related, but not limited, to the field of communication technology, and particularly related, but not limited, to a method and apparatus for defending against cyber-attacks, a receiving device, and a computer storage medium.

BACKGROUND

With development of broadband metropolitan area network (MAN) and broadband Internet Protocol (IP) services, as a broadband access device, a broadband access server (BAS) provides user authentication, authorization, billing, and convergence and forwarding of a plurality of services, provides broadband IP Internet access for commercial buildings and community residents, and is a core device for broadband user access.

A broadband access service includes a control plane and a forwarding plane. The control plane is a core part for controlling broadband user access, including broadband user access protocol processing, authentication, authorization, and billing for broadband user access, and issuing a forwarding table to the forwarding plane and providing equipment management and maintenance functions. The control plane and the forwarding plane may be deployed in a distributed manner, and one control plane can control and manage a plurality of forwarding planes to meet more requirements of broadband user access.

As a core part of the broadband access service, high reliability is required on the control plane. For example, quick reaction in preventing attack of a cyber-attack message, i.e., the control plane is able to meet a broadband user's requirement on access performance even in a case where there are a large quantity of cyber-attack messages.

For a conventional broadband access server, after receiving a broadband user access message, confirmation is performed through look up table for a plurality of times on the broadband user access message. If the message is determined to be transmitted to the control plane, the message is transmitted to the control plane after a processing of limiting a transmission rate of messages to achieve an effect of preventing the control plane from being attacked. However, after the processing of limiting the transmission rate of messages, some normal user access messages are discarded, because the broadband access server is not able to distinguish normal user access messages from cyber-attack messages. For example, an attacker duplicates normal user access messages through a network, and then transmits a large quantity of duplicated messages as cyber-attack messages to the broadband access server. As a result, it is difficult for the broadband access server to distinguish the normal user access messages from the cyber-attack messages.

In addition, as network functions virtualization (NFV) technologies are getting developed and universal, an X86 server, a storage and switch device based on an industry standard are gradually replacing network devices dedicated to a communication network, saving tremendous investments for operators and acquiring more flexible network capabilities. Broadband access devices are no exception. Therefore, in terms of preventing the control plane from being attacked, if the method of the look up table for a plurality of times and limiting the transmission rate of messages in the conventional broadband access device is adopted in a virtualization environment, a large quantity of processing power of a central processing unit (CPU) would be consumed. Consequently, existence of a large quantity of cyber-attack messages directly impact normal user accesses.

SUMMARY

Some embodiments of the present disclosure are intended to provide a method and apparatus for defending against cyber-attacks, a receiving device and a computer storage medium.

Some embodiments of the present disclosure provide a method for defending against cyber-attacks. In the method, an apparatus for defending against cyber-attacks randomly generates a new keyword. The apparatus for defending against cyber-attacks transmits the new keyword to a transmitting device and a receiving device, respectively. The receiving device updates a keyword set of the receiving device to include the new keyword, acquires a keyword carried in a communication message transmitted by the transmitting device, and determines whether the communication message is a cyber-attack message according to the keyword carried and the keyword set. The receiving device discards the communication message in response to the communication message being determined to be a cyber-attack message.

Some embodiments of the present disclosure further provide an apparatus for defending against cyber-attacks. The apparatus includes a first processor, a first memory and a first communication bus. The first communication bus is configured to implement connection communication between the first processor and the first memory. The first processor is configured to execute one or more computer programs stored in the first memory to perform operations implemented by the apparatus for defending against cyber-attacks in the method for defending against cyber-attacks as described in the above.

Some embodiments of the present disclosure further provide a receiving device. The receiving device includes a second processor, a second memory and a second communication bus. The second communication bus is configured to implement connection communication between the second processor and the second memory. The second processor is configured to execute one or more computer programs stored in the second memory to perform operations implemented by the apparatus for defending against cyber-attacks in the method for defending against cyber-attacks as described in the above.

Some embodiments of the present disclosure further provide a computer storage medium storing one or more programs executable by one or more processors to perform at least one operation of the method for defending against cyber-attacks as described in the above.

Other features and advantages are described in the following parts of the specification. It shall be appreciated that at least some advantages become evident based on the description in the present disclosure.

DETAILED DESCRIPTION

In order to make the objective, the technical solution and the advantages of the present disclosure clearer, some embodiments of the present disclosure will be explained below in detail with reference to the accompanying drawings and embodiments. It should be understood that the specific embodiments described here only explain the disclosure but do not put a limitation to the disclosure.

Embodiment 1

Figure 1:
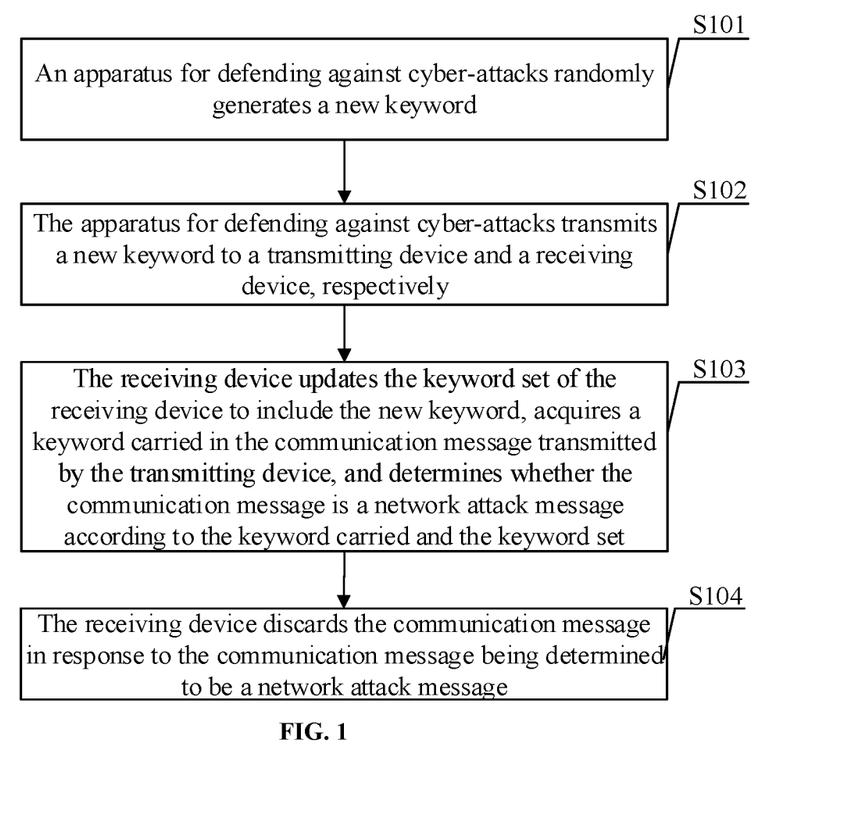
FIG. 1 is a flow chart for a method for defending against cyber-attacks according to an embodiment of the present disclosure.

For a conventional broadband access server, after receiving a broadband user access message, confirmation is performed through look up table for a plurality of times on the broadband user access message. If the broadband user access message is a message to be transmitted to a control plane, the message is transmitted to the control plane after a processing of limiting a transmission rate of messages, so as to achieve an effect of preventing the control plane from being attacked. However, the broadband access server is not able to effectively distinguish normal user access messages from cyber-attack messages, and some normal user access messages are discarded. In addition, in terms of preventing a control plane from being attacked, if a method of the look up table for a plurality of times and limiting the transmission rate of messages in the conventional broadband access device is adopted in a virtualization environment, a large quantity of CPU processing power would be consumed. Therefore, in a case where a large quantity of cyber-attack messages exist, normal user accesses would be directly impacted. In order to address these problems, an embodiment of the present disclosure provides a method for defending against cyber-attacks. In this method, a new keyword is generated randomly and regularly, and dynamic new keywords are transmitted to transmission and reception communication devices. When a transmission communication device transmits a message carrying a keyword, a reception communication device receives the message carrying the keyword and first compares whether the keyword carried in the message is consistent with a keyword locally stored. If the keyword carried in the message is consistent with a keyword locally stored, the message is normally processed. If the keyword carried in the message is inconsistent with a keyword locally stored, it is decided that the message is a cyber-attack message and the message is discarded for the purpose of anti-attack. FIG. 1 is a flow chart of a method for defending against cyber-attacks. As shown in FIG. 1, the method includes the following operations.

In S101, an apparatus for defending against cyber-attacks randomly generates a new keyword.

In this embodiment, the new keyword generated has randomness. The keyword is configured to identify a piece of information. The keyword may be a number or a character string carried in a communication message, disabling an attacker against predicting a next keyword. For example, a new keyword 1 (e.g., a number "30") is generated at a time point t1, and a new keyword 2 (e.g., a character string "abcd123") is generated at a time point t2. The new keyword 1 differs from the new keyword 2 and no logic is included. It may be appreciated that the new keywords may be generated regularly and there is a fixed interval before the new keywords generated at two successive time points. For example, the time interval may be 20 s, 60 s, 90 s, 150 s or the like. There is no doubt that an interval between t1 and t2 may differ from an interval between t2 and a time point t3. This may be flexibly adjusted as desired.

In S102, the apparatus for defending against cyber-attacks transmits the new keyword to a transmitting device and a receiving device, respectively.

It shall be noted that the apparatus for defending against cyber-attacks transmits the new keyword to the receiving device first, and then to the transmitting device. For example, the apparatus for defending against cyber-attacks transmits the new keyword to the receiving device. After the receiving device adds the new keyword to a keyword set of the receiving device, the receiving device reports acknowledgement information to the apparatus for defending against cyber-attacks. After receiving the acknowledgement information, the apparatus for defending against cyber-attacks transmits the new keyword to the transmitting device. Here, if a communication message transmitted by the transmitting device carries a latest new keyword, it is certain that the keyword set of the receiving device includes the latest new keyword, thereby preventing the receiving device from discarding a normal communication message. Therefore, the keyword set in this embodiment includes at least one keyword just generated.

After the apparatus for defending against cyber-attacks transmits the new keyword to the transmitting device, the transmitting device updates an old keyword locally stored to a new keyword. An attacker may duplicate a normal user communication message including the old keyword through a network. Therefore, in order to facilitate the receiving device better distinguishing normal communication messages from cyber-attack messages, the transmitting device returns acknowledgement information after a keyword of the transmitting device is updated to the new keyword. After the apparatus for defending against cyber-attacks receives the acknowledgement information about updating and storing of the new keyword by the transmitting device, the apparatus for defending against cyber-attacks notifies the receiving device of deleting an oldest keyword in the keyword set. Here, whether a keyword is new or old is determined by a time when the keyword is added into the keyword set. A keyword added latest is newest. For example, the receiving device currently includes a keyword set, {key-n−2, key-n−1, key-n}. In this keyword set, key-n−1 is newer than key-n−2. Key-n is a new keyword added to the keyword set latest, and keyword key-n−2 is deleted.

In this embodiment, one transmitting device may correspond to one receiving device. Alternatively, a plurality of transmitting devices may correspond to one receiving device, and thus the receiving device includes a plurality of communication channels, each corresponding to a respective transmitting device. Each of the plurality of communication channels corresponds to a respective keyword set of the receiving device. Therefore, after receiving a new keyword, the receiving device adds the new keyword to the respective keyword set. It may be appreciated that the keyword sets of the receiving device may be either entirely or partially the same. For example, a keyword set corresponding to communication channel 1 is {key-n−2, key-n−1, key-n}, while a keyword set corresponding to communication channel 2 is {m−2, m−1, key-n}.

In some embodiments, the apparatus for defending against cyber-attacks may transmit the new keyword to the transmitting device and the receiving device simultaneously. Then the transmitting device updates and stores the new keyword, while the receiving device replaces the oldest keyword in the keyword set with the new keyword. If the communication message transmitted by the transmitting device carries the new keyword and the keyword set of the receiving device includes the new keyword, the keyword set includes at least one keyword generated latest.

In S103, the receiving device updates a keyword set of the receiving device to include the new keyword, acquires a keyword carried in a communication message transmitted by the transmitting device, and determines whether the communication message is a cyber-attack message according to the keyword carried and the keyword set.

In some embodiments of the present disclosure, the transmitting device transmits the communication message to the receiving device through a data transmission channel between the transmitting device and the receiving device. The receiving device acquires the communication message transmitted by the transmitting device, extracts the keyword carried in the communication message, and determines whether the communication message is a cyber-attack message by determining whether a keyword set corresponding to the data transmission channel includes the keyword carried. It may be appreciated that a plurality of data transmission channels between the plurality of transmitting devices and the receiving device may be different from each other, and the keyword sets of the receiving device corresponding to the plurality of data transmission channels may be different. Therefore, a communication message is determined through a keyword set corresponding to the data transmission channel through which the communication message has been transmitted. If the transmitting device transmits a communication message of a normal user, the keyword carried is the new keyword received. Here, if a corresponding keyword set in the receiving device also includes the new keyword, the receiving device may determine that the communication message is a normal communication message. If the communication message transmitted by the transmitting device is a cyber-attack message duplicated through the network, a keyword carried in the cyber-attack message is an old keyword, and the keyword set in the receiving device does not include the old keyword. This indicates that the communication message is a cyber-attack message.

In some embodiments of the present disclosure, in order to prevent a normal communication message from being discarded due to inconsistency of times when the transmitting device and the receiving device update keywords, one keyword set has to be retained in the receiving device. It may be set that 2 or more new keywords at the most are retained in the keyword set. For example, the receiving device receives a first new keyword at a time point ta, and the transmitting device receives the first new keyword at a time point tb. The receiving device receives a second new keyword at a time point tc, and the transmitting device does not receive the second new keyword before a time point td. When the transmitting device transmits a normal communication message carrying the first new keyword at time point td, the time point to being earlier than the time point tb earlier than the time point tc earlier than the time point td, the keyword set of the receiving device at least includes {first new keyword, second new keyword} when the receiving device receives the communication message. There is a time difference between the keyword updates of the receiving device and the transmitting device. Here, according to the first new keyword in the keyword set, it can be clarified that the communication message is not a cyber-attack message, thereby discarding of the normal communication message is avoided.

In some embodiments, when the receiving device and the transmitting device simultaneously receive and store the new keyword, there is no time difference between the keyword updates of the transmitting device and the receiving device. Here, the keyword set in the receiving device may only include the new keyword, and then it may be determined whether the keyword carried in the communication message of the transmitting device is the same as the keyword of the receiving device to identify the communication message. If the communication message transmitted by the transmitting device is a normal communication message, it is certain that the communication message carries the new keyword.

In some embodiments, the transmitting device includes but not limited to a Customer Premise Equipment (CPE), a Broadband Remote Access Server (BRAS), a Broadband Network Gateway (BNG), a Broadband Service Gateway (BSG), a Service Router (SR), a Broadband Access Server (BAS), an OpenFlow Logical Switch (OFLS), an OpenFlow Switch (OFS), a wireless Access Controller (AC), an Optical Line Terminal (OLT), a convergence switch, a virtual Broadband Remote Access Server (vBRAS) forwarding plane device, a virtual Broadband Access Server (vBAS) forwarding plane device, and a virtual Broadband Network Gateway (vBNG) forwarding plane device. The transmitting device includes but not limited to a Broadband Remote Access Server (BRAS), a Broadband Network Gateway (BNG), a Broadband Service Gateway (BSG), a Service Router (SR), a Broadband Access Server (BAS), an OpenFlow Logical Switch (OFLS), an OpenFlow Switch (OFS), a wireless Access Controller (AC), a virtual Broadband Remote Access Server (vBRAS) control plane device, a virtual Broadband Access Server (vBAS) control plane device, and a virtual Broadband Network Gateway (vBNG) control plane device.

It shall be noted that acquiring the communication message transmitted by the transmitting device and extracting the keyword carried in the communication message includes: the receiving device extracting the keyword from available fields or expanded fields defined in a standard communication protocol, or a vendor's privately defined fields added to the communication message. For example, when the transmitting device includes the vBRAS forwarding plane device, the receiving device acquires Network Service Header (NSH) information and a broadband user access protocol message from the communication message, and extracts the keyword from the NSH information. For example, when a broadband user accesses to the network, a broadband access protocol message is transmitted to vBRAS. Specifically, the broadband access protocol message is transmitted, through an access network, to the vBRAS forwarding plane device. Then the vBRAS forwarding plane device encapsulates the broadband access protocol message (such as a point-to-point protocol over Ethernet (PPPoE) and a dynamic host configuration protocol (DHCP)) and the NSH information (refer to Network Service Header defined by an Internet engineering task force (IETF)) together. Herein, the NSH information includes the keyword of the transmitting device. Further, the receiving device receives the communication message, obtains the broadband access protocol message and the NSH information through parsing, and extracts the keyword from the NSH information.

When the transmitting device includes an optical line terminal (OLT) device, the receiving device acquires the keyword from a user datagram protocol (UDP) source port number in the communication message. For example, when a broadband user accesses to the network, the broadband user first accesses an optical network unit (ONU) device and then accesses the access network. The broadband access protocol message is transmitted to the OLT device, and then the OLT device encapsulates the broadband access protocol message to a virtual extensible local area network (VxLAN) tunnel between the OLT device and the vBRAS forwarding plane device. Herein, a UDP source port number of the VXLAN tunnel is set as a keyword. Then the receiving device extracts the UDP source port number from the message of the vBRAS forwarding plane device. The UDP source port number is the keyword.

In S104, the receiving device discards the communication message in response to the communication message being determined to be a cyber-attack message.

The receiving device discards the communication message when it is identified that the communication message includes the cyber-attack message. When the communication message is a normal communication message, the communication message is reported to the control plane for further processing.

In the method for defending against cyber-attacks provided in the embodiment of the present disclosure, a random keyword is transmitted to the receiving device and the transmitting device. The receiving device and the transmitting device respectively perform update and storage according to the new keyword, making a communication message transmitted by the transmitting device carry the new keyword. In this way, it is easy to identify cyber-attack messages transmitted by the attacker and normal communication messages. Besides, since the keyword is random, the attacker can by no means predict a next keyword carried in a normal communication message. Therefore, the problem that cyber-attack messages can not be distinguished from normal user access messages is addressed, thereby preventing user normal communication messages from being discarded.

Embodiment 2

Figure 2:
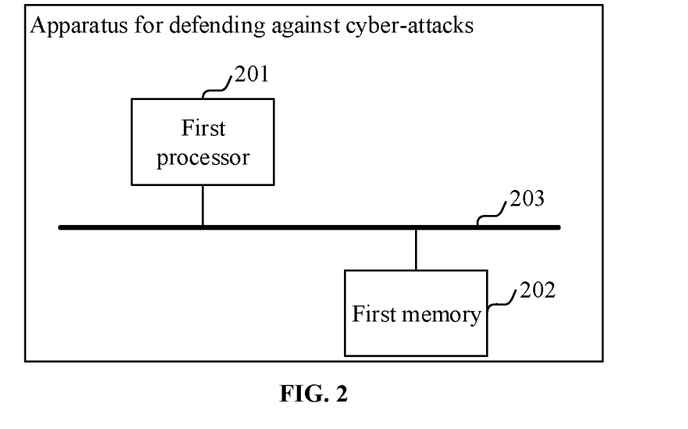
FIG. 2 is a schematic diagram for a structure of an apparatus for defending against cyber-attacks according to an embodiment of the present disclosure.

In an embodiment, an apparatus for defending against cyber-attacks is provided. As shown in FIG. 2, the apparatus includes a first processor 201, a first memory 202 and a first communication bus 203.

The first communication bus 203 is configured to implement connection communication between the first processor 201 and the first memory 202.

The first processor 201 is configured to execute one or more computer programs stored in the first memory to implement the following operations.

A new keyword is randomly generated.

The new keyword is transmitted to a transmitting device and a receiving device, respectively.

In this embodiment, the new keyword is transmitted to the receiving device. After the new keyword is added to a keyword set of the receiving device, the new keyword is transmitted to the transmitting device. After the keyword of the transmitting device is updated to the new keyword, the receiving device is notified of deleting an oldest keyword in the keyword set. In some embodiments, the keyword may be simultaneously transmitted to the transmitting device and the receiving device.

Figure 3:
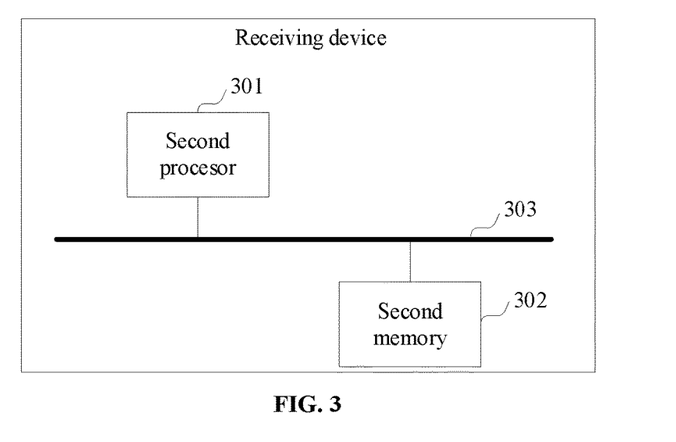
FIG. 3 is a schematic diagram for a structure of a receiving device according to an embodiment of the present disclosure.

In an embodiment, a receiving device is provided. As shown in FIG. 3, the receiving device includes a second processor 301, a second memory 302 and a second communication bus 303.

The second communication bus 303 is configured to implement connection communication between the second processor 301 and the second memory 302.

The second processor 301 is configured to execute one or more computer programs stored in the second memory to implement the following operations.

A keyword set is updated to include the new keyword. A keyword carried in a communication message transmitted by a transmitting device is acquired. Whether the communication message is a cyber-attack message is determined according to the keyword carried and the keyword set.

The communication message is discarded in response to the communication message being determined to be a cyber-attack message.

It shall be noted that in this embodiment, the second processor 301 acquiring the keyword carried in the communication message transmitted by the transmitting device and determining whether the keyword set includes the keyword includes: acquiring the communication message transmitted by the transmitting device, the communication message being transmitted through a data transmission channel between the transmitting device and the receiving device; extracting the keyword carried in the communication message; determining whether a keyword set corresponding to the data transmission channel includes the keyword carried; and the communication message being determined as a cyber-attack message, in response to the keyword set corresponding to the data transmission channel not including the keyword carried. Herein, in response to the transmitting device including a vBRAS forwarding plane device, the receiving device acquires NSH information and a broadband user access protocol message from the communication message, and extracts the keyword from the NSH information. In response to the transmitting device including an OLT device, the receiving device acquires the keyword from a UDP source port number in the communication message.

Figure 4:
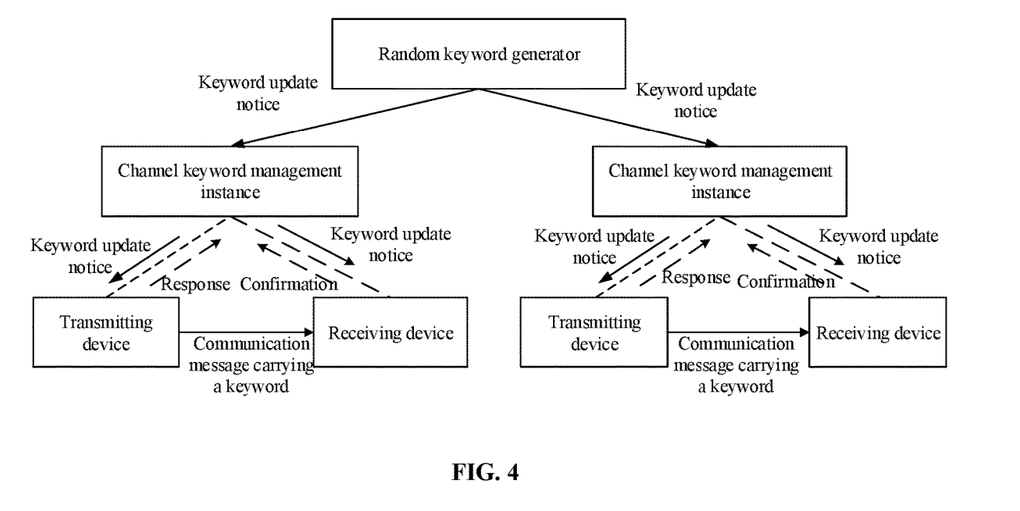
FIG. 4 is a schematic diagram of connection for an apparatus for defending against cyber-attacks, a receiving device and a transmitting device according to an embodiment of the present disclosure.

FIG. 4 is a schematic diagram showing relationship among an apparatus for defending against cyber-attacks, a transmitting device and a receiving device according to an embodiment. The apparatus for defending against cyber-attacks includes a random keyword generator and a plurality of channel keyword management instances. The random keyword generator regularly and randomly generates a keyword and transmits a generated keyword to each of the plurality of channel keyword management instances. After receiving the keyword, a channel keyword management instance first transmits a new keyword to the receiving device. After receiving the new keyword, the receiving device adds the new keyword to the keyword set and returns an acknowledgement. After receiving the acknowledgement from the receiving device, the channel keyword management instance transmits the new keyword to the transmitting device. After receiving the new keyword, the transmitting device replaces an old keyword with the new keyword and returns an acknowledgement. After receiving the acknowledgement from the transmitting device, the channel keyword management instance notifies the receiving device of deleting an oldest keyword in the keyword set. When the transmitting device transmits a communication message, the communication message carries a keyword. After receiving the communication message, the receiving device first determines whether the keyword carried in the communication message is an element in the keyword set. If yes, the communication message is determined to be normal and following processing continues. If no, the communication message is determined to be a cyber-attack message and is immediately discarded.

Some embodiments provide an apparatus for defending against cyber-attacks and a receiving device. The apparatus for defending against cyber-attacks generates new keywords and dynamic new keywords are transmitted to transmission and reception communication devices. The receiving device replaces an old keyword in a locally stored keyword set with a new keyword. When a transmission communication device transmits a message carrying a newest keyword, the reception communication device receives the message carrying the keyword. The reception communication device first compares whether the keyword in the message is consistent with a keyword in the locally stored keyword set. If yes, the message is normally processed. If no, it is decided that the message is an attack message and the message is discarded for the purpose of anti-attack. This, in a virtualized environment, may significantly reduce consumption of CPU processing resources for identifying network attach messages, and improves access performance of normal users in a case where a large quantity of cyber-attack messages exist.

Embodiment 3

Figure 5:
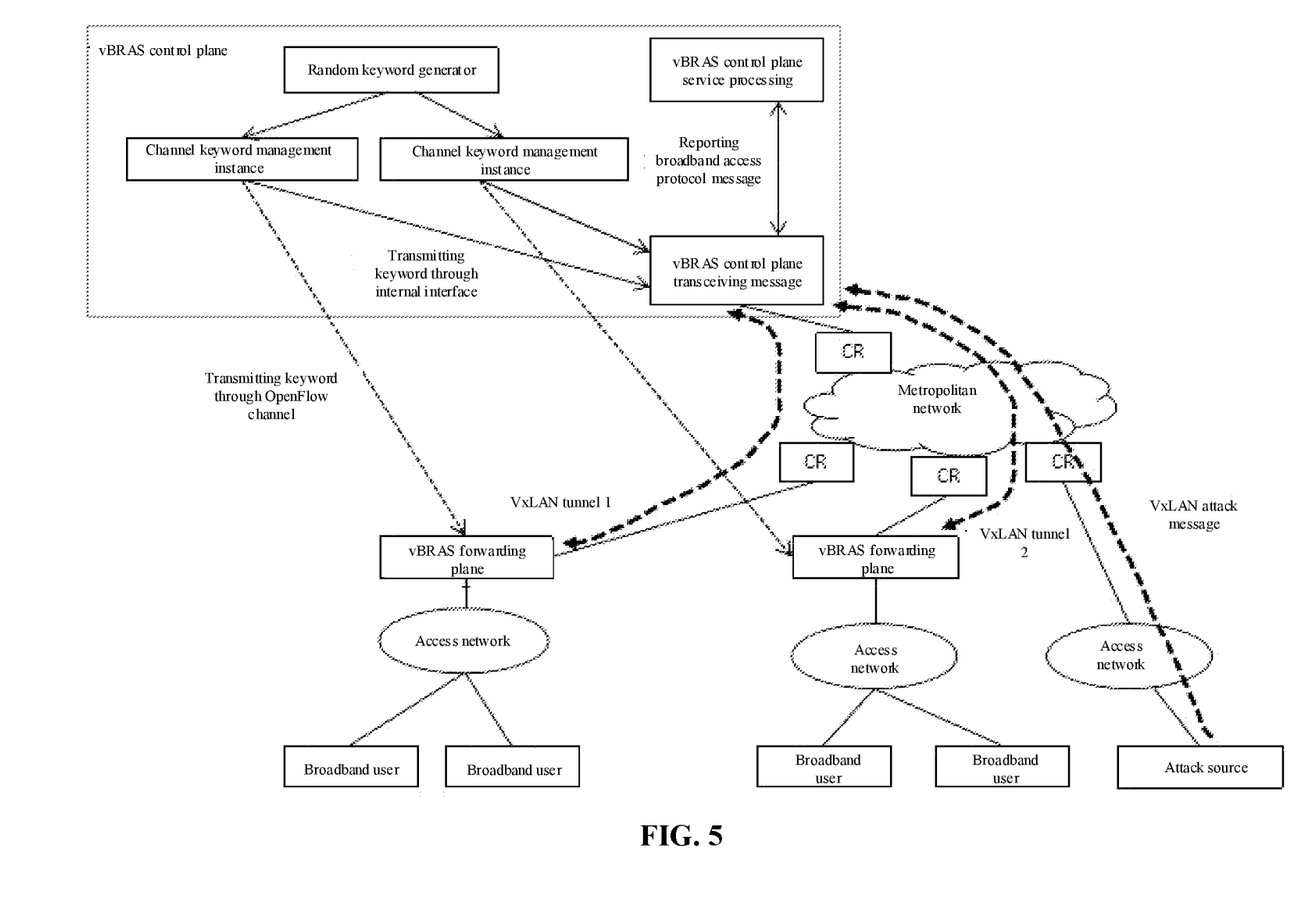
FIG. 5 is schematic diagram for assembling a network for an anti-attack deployment scenario including a virtual broadband remote access server (vBRAS) control plane according to an embodiment of the present disclosure.

In an embodiment, a specific scenario is presented to describe a method and system for defending against cyber-attacks. As shown in FIG. 5, an anti-attack deployment scenario of a vBRAS control plane is described. A vBRAS control plane device is deployed in a data center to control a plurality of vBRAS forwarding plane devices through a metropolitan area network in a centralized manner. The plurality of vBRAS forwarding plane devices are deployed at an edge of the metropolitan area network. A user's access protocol message (such as PPPoE and DHCP) and NSH information (refer to network service header defined by an Internet engineering task force (IETF)) are transmitted to the vBRAS forwarding plane through a VxLAN tunnel between the vBRAS control plane and the vBRAS forwarding plane and through a core router (CR). After receiving a VxLAN message, and after de-capsulating VxLAN and NSH information, a transceiving message processing module of the vBRAS control plane acquires a broadband user access protocol message, and transmits the broadband user access protocol message to a service processing module of the vBRAS control plane. However, the vBRAS control plane is a centralized control point of access of broadband users. If there are a large quantity of VxLAN attack messages, processing performance of the vBRAS control plane would be directly impacted. An even more serious result is that a normal broadband user access message can not be processed timely, resulting in failure to access to the Internet of a large quantity of broadband users.

In this embodiment, a random keyword generator and a plurality of channel keyword management instances are deployed as software modules in the vBRAS control plane device, a transmitting device includes a plurality of vBRAS forwarding plane devices, a receiving device is the transceiving message processing module of the vBRAS control plane device, and the channels refers to the VXLAN tunnel between the vBRAS forwarding plane devices and the vBRAS control plane device. Each of the plurality of channel keyword management instances on logic manages a keyword of VXLAN tunnel communication between one of the plurality of vBRAS forwarding plane devices and the vBRAS control plane device. In this embodiment, a hardware module of the vBRAS control plane device may be implemented through an X86 server, and a hardware module of the plurality of vBRAS forwarding plane devices may be implemented through a BRAS device.

Figure 6:
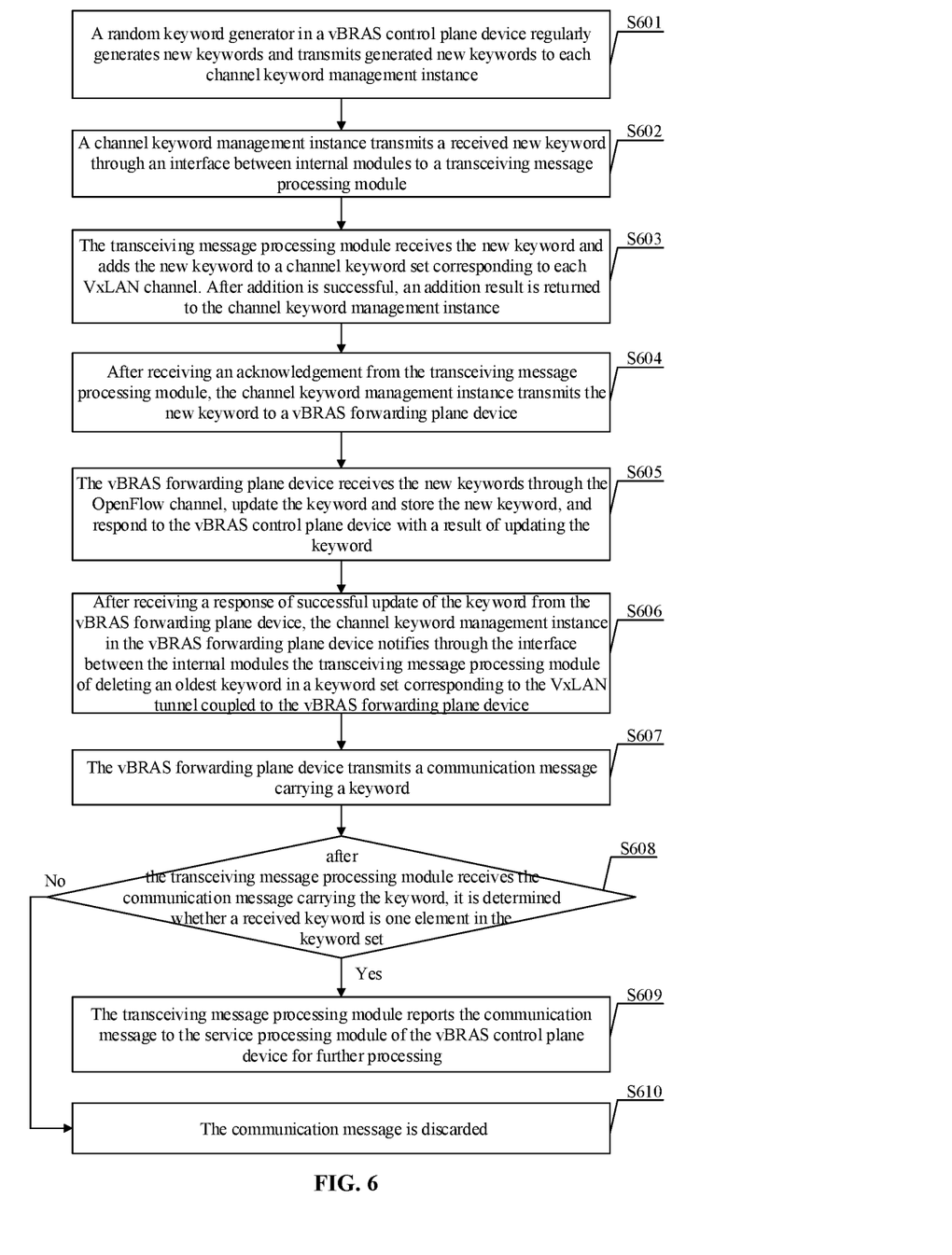
FIG. 6 is a flow chart for a method for defending against cyber-attacks according to an embodiment of the present disclosure.

As shown in FIG. 6, a defense method based on a system for defending against cyber-attacks includes the following operations.

In S601, a random keyword generator in a vBRAS control plane device regularly generates new keywords and transmits generated new keywords to each channel keyword management instance.

In this embodiment, the random keyword generator may generate a new keyword every 20 s, for example, issues a new keyword key-n.

In S602, a channel keyword management instance issues a received new keyword through an interface between internal modules to a transceiving message processing module.

In S603, the transceiving message processing module receives the new keyword and adds the new keyword to a channel keyword set corresponding to each VxLAN channel. After addition is successful, an addition result is returned to the channel keyword management instance.

For example, channel keyword set information after the addition of the new keyword is as follows: a vlan tunnel 1 corresponds to a channel keyword set of {key-n-2, key-n-1, key-n}, and a vlan tunnel 2 corresponds to a channel keyword set of {key-m-2, key-m-1, key-n}. Herein, in these channel keyword sets, key-n-1 is newer than key-n-2, key-m-2 is newer than key-m-1, and key-n is a keyword added to the sets latest.

In S604, after receiving an acknowledgement from the transceiving message processing module, the channel keyword management instance transmits the new keyword to a vBRAS forwarding plane device corresponding to the channel keyword management instance.

The new keyword key-n is transmitted to the vBRAS forwarding plane device through an OpenFlow channel coupled to the corresponding vBRAS forwarding plane device.

In S605, the vBRAS forwarding plane device receives the new keyword through the OpenFlow channel, update the keyword set and store the new keyword, and respond to the vBRAS control plane device with a result of updating the keyword.

In S606, after receiving a response of successful update of the keyword of the vBRAS forwarding plane device, the channel keyword management instance in the vBRAS control plane device notifies through the interface between the internal modules the transceiving message processing module of deleting an oldest keyword in a VXLAN channel keyword set corresponding to the vBRAS forwarding plane device.

After a keyword update result responded by the vBRAS forwarding surface device coupled to a VXLAN tunnel 1 is received, the transceiving message processing module is notified of deleting the keyword key-n−2 in the channel keyword set corresponding to the VXLAN tunnel 1 through the interface between the internal modules.

In S607, the vBRAS forwarding plane device transmit a communication message carrying a keyword.

When a broadband user accesses to the Internet, a broadband access protocol message is first transmitted to vBRAS. Specifically, the broadband access protocol message is transmitted to the vBRAS forwarding plane device through an access network. Then the vBRAS forwarding plane device encapsulates the broadband access protocol message and NSH information into the VxLAN tunnel. Herein, the NSH information includes a keyword. For example, an MD-type value defined in an NSH protocol is set as 0x1, and a Context data value is the keyword key-n.

In S608, after the transceiving message processing module receives the communication message carrying the keyword, it is determined whether a received keyword is one element in the keyword set. If yes, S609 is implemented. If no, S610 is implemented.

After receiving the VXLAN message transmitted by the vBRAS forwarding plane device through the VXLAN tunnel, the transceiving message processing module of the vBRAS control plane device de-capsulates the VXLAN message, and acquires the NSH information and the broadband user access protocol message. The transceiving message processing module first subtracts a keyword in the NSH information, determines whether the keyword carried in the reception message is a keyword in the channel keyword set corresponding to the VXLAN tunnel. If yes, the broadband user access protocol message is transmitted to the service processing module of the vBRAS control plane device for further processing. If no, the broadband user access protocol message is determined to be a cyber-attack message and is immediately discarded. For example, the transceiving message processing module of the vBRAS control plane device receives the VXLAN message from VXLAN tunnel 1, acquires the keyword key-n from context data of NSH carried by the message, and searches a keyword set {key-n−1, key-n} corresponding to VXLAN tunnel 1. It is found that key-n is an element in {key-n−1, key-n}. Thus, it is determined that the VXLAN message is a legitimate message. Concerning a VXLAN message received from an attack source, however, a keyword acquired from context data of NSH is not an element in the keyword set {key-n−1, key-n}, and thus it is determined that the VXLAN message is an attack message and the VXLAN message is immediately discarded.

In S609, the transceiving message processing module reports the communication message to the service processing module of the vBRAS control plane device for further processing.

In S610, the communication message is discarded.

Embodiment 4

Figure 7:
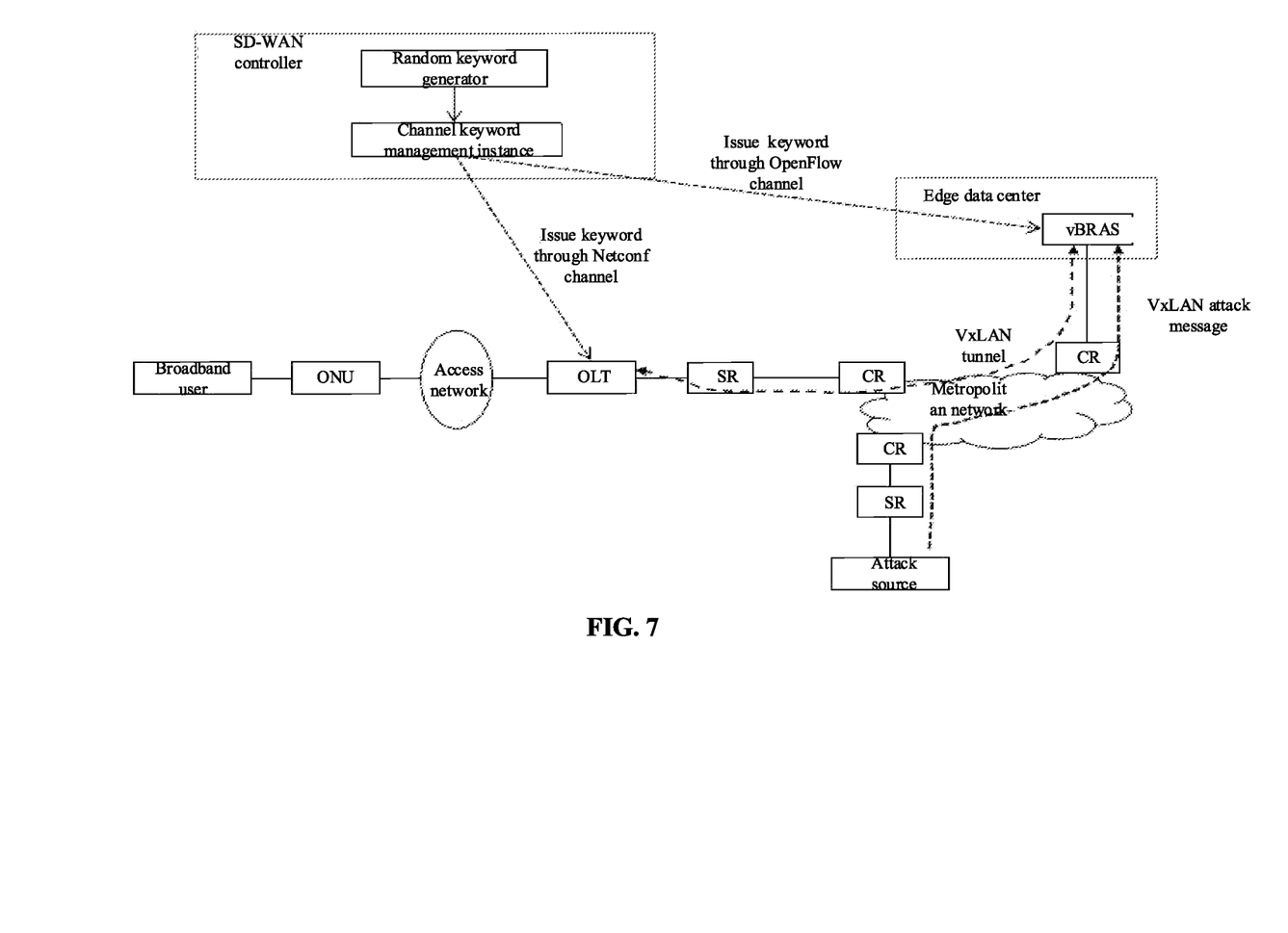
FIG. 7 is schematic diagram for assembling a network for an anti-attack deployment scenario including a vBRAS device and a virtual extensible local area network (VxLAN) according to an embodiment of the present disclosure.

In an embodiment, a scenario for an anti-attack deployment including a vBRAS and a VxLAN is provided to describe a method and system for defending against cyber-attacks. As shown in FIG. 7, a vBRAS device (a vBRAS control plane and a forwarding plane are collectively deployed) is deployed in an Edge Data Center. When a broadband user accesses to the Internet, a broadband user access protocol message is transmitted to an OLT device through an optical network unit (ONU) device and an access network. The OLT device then transmits the broadband user access protocol message through the VxLAN tunnel to a vBRAS forwarding plane deployed in the edge data center. After receiving the VXLAN message, the vBRAS forwarding plane determines the VXLAN message to be a VXLAN message from a broadband access side, de-capsulates the VXLAN message to acquire the broadband user access protocol message, which is then transmitted to the vBRAS control plane for processing. Here, if an attack source attacks a broadband access side interface of a vBRAS forwarding plane device by transmitting a large quantity of VXLAN messages, the vBRAS forwarding plane would consume a large quantity of CPU processing resources to process attack messages. This impacts normal broadband user accesses, or even results in abnormality in vBRAS control plane processing.

In this embodiment, a random keyword generator and a channel keyword management instance as software modules are deployed in a software-defined networking in a wide area network (SD-WAN) controller device. A transmitting device is the OLT device, a receiving device is the vBRAS forwarding plane device, and the channel refers to a VXLAN tunnel between OLT and the vBRAS forwarding plane. A channel keyword management instance on logic manages a keyword of VxLAN tunnel communication between an OLT and a vBRAS forwarding plane. The SD-WAN controller device may be implemented through a hardware module of an X86 server. The transmitting device may be an OLT device.

Figure 8:
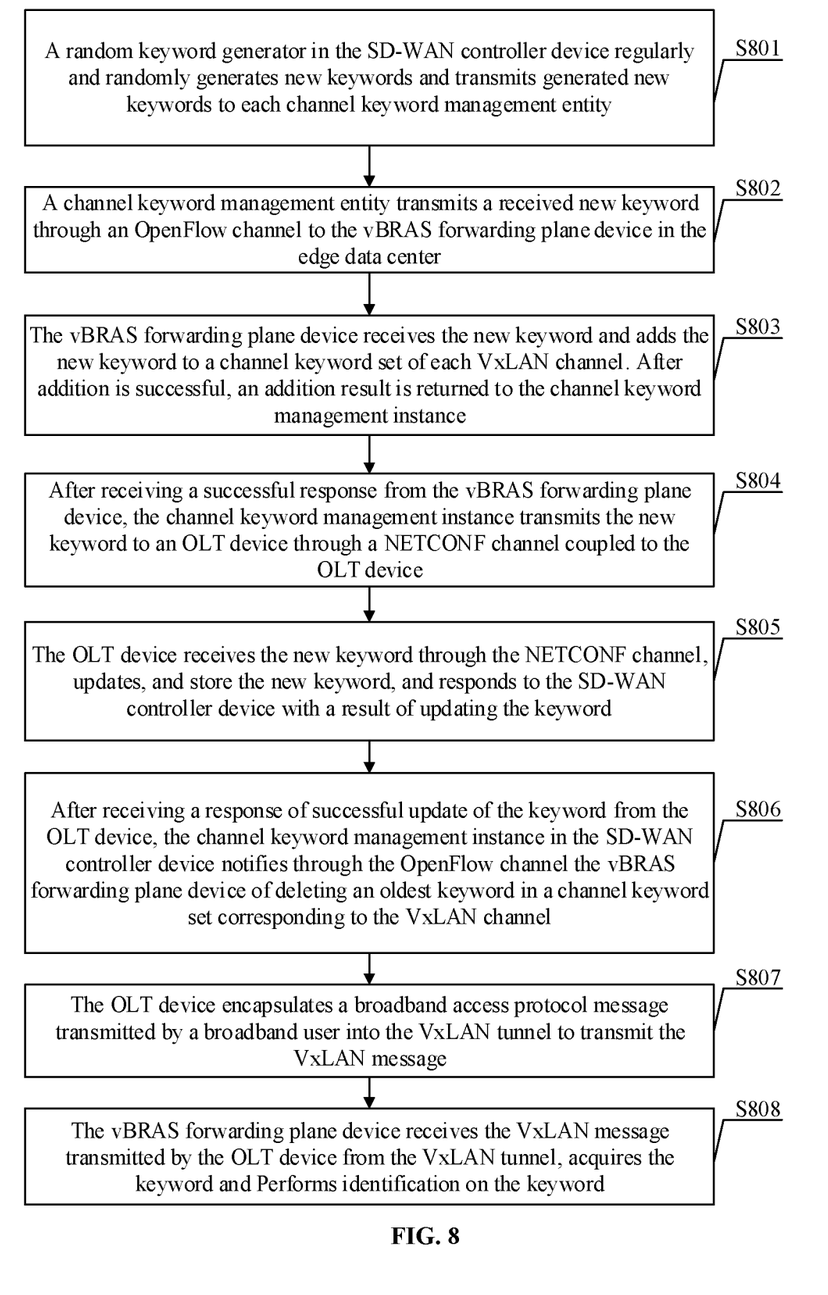
FIG. 8 is a flow chart for a method for defending against cyber-attacks according to an embodiment of the present disclosure.

As shown in FIG. 8, a defense method based on a system for defending against cyber-attacks includes the following operations.

In S801, a random keyword generator in the SD-WAN controller device regularly and randomly generates new keywords and transmits generated new keywords to each channel keyword management instance.

In S802, a channel keyword management instance issues a received new keyword through an OpenFlow channel to the vBRAS forwarding plane device in the edge data center.

In S803, the vBRAS forwarding plane device receives the new keyword and adds the new keyword to a channel keyword set corresponding to each VxLAN channel. After addition is successful, an addition result is returned to the channel keyword management instance.

In S804, after receiving an acknowledgement from the vBRAS forwarding plane device, the channel keyword management instance transmits the new keyword to the OLT device through a network configuration protocol (NET-CONF) channel coupled to the OLT device.

In S805, the OLT device receives the new keyword through the NETCONF channel, updates the keyword and store the new keyword, and responds to the SD-WAN controller device with a result of updating the keyword.

In S806, after receiving a response of successful update of the keyword from the OLT device, the channel keyword management instance in the SD-WAN controller device notifies through the OpenFlow channel the vBRAS forwarding plane device of deleting an oldest keyword in a keyword set corresponding to the VXLAN channel.

In S807, the OLT device encapsulates a broadband access protocol message transmitted by a broadband user into the VXLAN tunnel, and transmits the VXLAN message.

In this embodiment, when the broadband user accesses to the Internet, the broadband access protocol message is transmitted to the OLT device first through the ONU device and then the access network. Then the OLT device encapsulates the broadband access protocol message into the VXLAN tunnel. Herein, a UDP source port number of the VXLAN tunnel is set as the new keyword. For example, a new keyword 3000 is taken as the UDP source port number of the VXLAN tunnel, and then the VXLAN message carries the new keyword.

In S808, the vBRAS forwarding plane device receives the VXLAN message transmitted by the OLT device from the VXLAN tunnel, acquires the keyword and performs identification on the keyword.

After receiving the VXLAN message transmitted by the OLT device from the VXLAN tunnel, the vBRAS forwarding plane device acquires the UDP source port number in the VXLAN message, and takes the UDP source port number 3000 as a received keyword. The vBRAS forwarding plane device determines whether the keyword 3000 is an element in the keyword set in the VXLAN tunnel. Since the keyword set in the VXLAN tunnel includes the keyword 3000, the broadband access protocol message is reported to the vBRAS control plane for further processing. If the keyword 3000 is not included, it is determined that the message is a cyber-attack message and the message is immediately discarded.

Embodiment 5

An embodiment of the present disclosure provides a computer storage medium that includes volatile or non-volatile, removable or irremovable media implemented in any method or technology for storing information (such as a computer readable instruction, a data structure, a computer program module or other data). The computer storage medium includes but not limited to a random access memory (RAM), a read-only memory (ROM), an electrically erasable programmable read only memory (EEPROM), a flash memory or other storage technologies, a compact disc read-only memory (CD-ROM), a digital versatile disc (DVD) or any other optical disc storage, magnetic cassette, magnetic tape, magnetic storage or any other magnetic storage apparatus, or another other medium that may be used for storing desired information and that is accessible by any other medium.

In this embodiment, the computer storage medium may be used to store one or more computer programs executable by a processor to implement at least one operation of the method for defending against cyber-attacks described in the above embodiments.

An embodiment of the present disclosure further provides a computer program product including a computer readable apparatus storing the computer program described in the above. In this embodiment, the computer readable apparatus may include the computer storage medium as described in the above.

Accordingly, a person having ordinary skill in the art shall understand that all or some of the operations, functional modules/units in the system and apparatus disclosed in the above can be implemented as software (which can be implemented by computer program codes executable by a computing apparatus), firmware, hardware, and appropriate combinations thereof. In the hardware implementation, the division between the functional modules/units mentioned described in the above does not necessarily correspond to division of physical components. For example, a physical component may have a plurality of functions, or one function or step may be performed by several physical components. Some or all physical components can be implemented as software implemented by a processor like a central processing unit, a digital signal processor, or a microprocessor, or as hardware, or as an integrated circuit like an application specific integrated circuit.

In addition, as is well known to a person having ordinary skill in the art, a communication medium usually includes a computer readable instruction, a data structure, a computer program module, or other data in a modulated data signal such as carrier waves or other transmission mechanisms, and may include any information delivery medium. Therefore, the present disclosure is not limited to any specific combination of hardware and software.

The above content is a further detailed description on the embodiments of the present disclosure in combination with specific implementations, and it cannot be decided that the specific implementations of the present disclosure are limited to the description. For a person having ordinary skill in the art, simple deductions or substitutions can be made without departing from the concept of the present disclosure, and shall be regarded as falling within the protection scope of the present disclosure.

What is claimed is:

1. A method for defending against cyber-attacks, comprising:
   generating, by an apparatus for defending against cyber-attacks, randomly a new keyword;
   transmitting, by the apparatus for defending against cyber-attacks, the new keyword to a transmitting device and a receiving device, respectively;
   updating, by the receiving device, a keyword set of the receiving device to include the new keyword, acquiring a keyword carried in a communication message transmitted by the transmitting device, and determining whether the communication message is a cyber-attack message according to the keyword carried and the keyword set; and
   discarding, by the receiving device, the communication message, in response to the communication message being determined to be a cyber-attack message;
   wherein acquiring the keyword carried in the communication message transmitted by the transmitting device and determining whether the communication message is a cyber-attack message comprises:
   acquiring the communication message transmitted by the transmitting device, the communication message being transmitted through a data transmission channel between the transmitting device and the receiving device;
   extracting the keyword carried in the communication message;
   determining whether a keyword set corresponding to the data transmission channel includes the keyword carried; and
   determining that the communication message is a cyber-attack message, in response to the keyword set corresponding to the data transmission channel not including the keyword carried.

2. The method according to claim 1, wherein respectively transmitting the new keyword to the transmitting device and the receiving device comprises:
   transmitting, by the apparatus for defending against cyber-attacks, the new keyword to the receiving device; and
   transmitting, by the apparatus for defending against cyber-attacks, the new keyword to the transmitting device, after the new keyword is added to the keyword set of the receiving device.

3. The method according to claim 2, wherein after the apparatus for defending against cyber-attacks transmits the new keyword to the transmitting device and before the receiving device acquires the keyword carried in the communication message transmitted by the transmitting device, the method comprises:
   notifying, by the apparatus for defending against cyber-attacks, the receiving device of deleting an oldest keyword in the keyword set after a keyword of the transmitting device is updated to the new keyword.

4. The method according to claim 1, wherein respectively transmitting the new keyword to the transmitting device and the receiving device comprises:
   transmitting, by the apparatus for defending against cyber-attacks, synchronously the new keyword to the transmitting device and the receiving device; and
updating, by the receiving device, the keyword set of the receiving device to include the new keyword, comprising:
   replacing, by the receiving device, an oldest keyword in the keyword set with the new keyword, while the transmitting device updates and stores the new keyword.

5. The method according to claim 1, wherein acquiring the communication message transmitted by the transmitting device and extracting the keyword carried in the communication message comprises:
   extracting, by the receiving device, the keyword, from available fields or expanded fields defined in a standard communication protocol, or a vendor's privately defined fields added to the communication message.

6. The method according to claim 1, wherein the keyword set comprises at least one lately generated keyword, comprising a number or a character string.

7. An apparatus for defending against cyber-attacks, comprising a first processor, a first memory and a first communication bus;
   the first communication bus being configured to implement connection communication between the first processor and the first memory; and
   the first processor being configured to execute one or more computer programs stored in the first memory to perform at least one operation implemented by the apparatus for defending against cyber-attacks in a method for defending against cyber-attacks;
   the method comprising:
      generating, by an apparatus for defending against cyber-attacks, randomly a new keyword;
      transmitting, by the apparatus for defending against cyber-attacks, the new keyword to a transmitting device and a receiving device, respectively;
      updating, by the receiving device, a keyword set of the receiving device to include the new keyword, acquiring a keyword carried in a communication message transmitted by the transmitting device, and determining whether the communication message is a cyber-attack message according to the keyword carried and the keyword set; and
      discarding, by the receiving device, the communication message, in response to the communication message being determined to be a cyber-attack message;
   wherein acquiring the keyword carried in the communication message transmitted by the transmitting device and determining whether the communication message is a cyber-attack message comprises:
      acquiring the communication message transmitted by the transmitting device, the communication message being transmitted through a data transmission channel between the transmitting device and the receiving device;
      extracting the keyword carried in the communication message;
      determining whether a keyword set corresponding to the data transmission channel includes the keyword carried; and
      determining that the communication message is a cyber-attack message, in response to the keyword set corresponding to the data transmission channel not including the keyword carried.

8. The apparatus according to claim 7, wherein respectively transmitting the new keyword to the transmitting device and the receiving device comprises:
   transmitting, by the apparatus for defending against cyber-attacks, the new keyword to the receiving device; and
   transmitting, by the apparatus for defending against cyber-attacks, the new keyword to the transmitting device, after the new keyword is added to the keyword set of the receiving device.

9. The apparatus according to claim 8, wherein after the apparatus for defending against cyber-attacks transmits the new keyword to the transmitting device and before the receiving device acquires the keyword carried in the communication message transmitted by the transmitting device, the method comprises:
   notifying, by the apparatus for defending against cyber-attacks, the receiving device of deleting an oldest keyword in the keyword set after a keyword of the transmitting device is updated to the new keyword.

10. The apparatus according to claim 7, wherein respectively transmitting the new keyword to the transmitting device and the receiving device comprises:
   transmitting, by the apparatus for defending against cyber-attacks, synchronously the new keyword to the transmitting device and the receiving device; and
updating, by the receiving device, the keyword set of the receiving device to include the new keyword, comprising:
   replacing, by the receiving device, an oldest keyword in the keyword set with the new keyword, while the transmitting device updates and stores the new keyword.

11. The apparatus according to claim 7, wherein the keyword set comprises at least one lately generated keyword, comprising a number or a character string.

12. A receiving device, comprising a second processor, a second memory and a second communication bus;
   the second communication bus being configured to implement connection communication between the second processor and the second memory; and
   the second processor being configured to execute one or more computer programs stored in the second memory to perform at least one operation implemented by the receiving device in a method for defending against cyber-attacks;
   the method comprising:

generating, by an apparatus for defending against cyber-attacks, randomly a new keyword;

transmitting, by the apparatus for defending against cyber-attacks, the new keyword to a transmitting device and a receiving device, respectively;

updating, by the receiving device, a keyword set of the receiving device to include the new keyword, acquiring a keyword carried in a communication message transmitted by the transmitting device, and determining whether the communication message is a cyber-attack message according to the keyword carried and the keyword set; and discarding, by the receiving device, the communication message, in response to the communication message being determined to be a cyber-attack message;

wherein acquiring the keyword carried in the communication message transmitted by the transmitting device and determining whether the communication message is a cyber-attack message comprises:

acquiring the communication message transmitted by the transmitting device, the communication message being transmitted through a data transmission channel between the transmitting device and the receiving device;

extracting the keyword carried in the communication message:

determining whether a keyword set corresponding to the data transmission channel includes the keyword carried; and determining that the communication message is a cyber-attack message, in response to the keyword set corresponding to the data transmission channel not including the keyword carried.

13. The receiving device according to claim 12, wherein respectively transmitting the new keyword to the transmitting device and the receiving device comprises:

transmitting, by the apparatus for defending against cyber-attacks, synchronously the new keyword to the transmitting device and the receiving device; and updating, by the receiving device, the keyword set of the receiving device to include the new keyword, comprising:

replacing, by the receiving device, an oldest keyword in the keyword set with the new keyword, while the transmitting device updates and stores the new keyword.

14. The receiving device according to claim 12, wherein acquiring the communication message transmitted by the transmitting device and extracting the keyword carried in the communication message comprises:

extracting, by the receiving device, the keyword, from available fields or expanded fields defined in a standard communication protocol, or a vendor's privately defined fields added to the communication message.

15. The receiving device according to claim 12, wherein the keyword set comprises at least one lately generated keyword, comprising a number or a character string.

16. A non-transitory computer readable storage medium, storing one or more programs executable by one or more processors to perform at least one operation of a method for defending against cyber-attacks;

the method comprising:

generating, by an apparatus for defending against cyber-attacks, randomly a new keyword;

transmitting, by the apparatus for defending against cyber-attacks, the new keyword to a transmitting device and a receiving device, respectively;

updating, by the receiving device, a keyword set of the receiving device to include the new keyword, acquiring a keyword carried in a communication message transmitted by the transmitting device, and determining whether the communication message is a cyber-attack message according to the keyword carried and the keyword set; and discarding, by the receiving device, the communication message, in response to the communication message being determined to be a cyber-attack message;

wherein acquiring the keyword carried in the communication message transmitted by the transmitting device and determining whether the communication message is a cyber-attack message comprises:

acquiring the communication message transmitted by the transmitting device, the communication message being transmitted through a data transmission channel between the transmitting device and the receiving device;

extracting the keyword carried in the communication message:

determining whether a keyword set corresponding to the data transmission channel includes the keyword carried; and determining that the communication message is a cyber-attack message, in response to the keyword set corresponding to the data transmission channel not including the keyword carried.

17. The non-transitory computer readable storage medium according to claim 16, wherein respectively transmitting the new keyword to the transmitting device and the receiving device comprises:

transmitting, by the apparatus for defending against cyber-attacks, the new keyword to the receiving device; and transmitting, by the apparatus for defending against cyber-attacks, the new keyword to the transmitting device, after the new keyword is added to the keyword set of the receiving device.

18. The non-transitory computer readable storage medium according to claim 17, wherein after the apparatus for defending against cyber-attacks transmits the new keyword to the transmitting device and before the receiving device acquires the keyword carried in the communication message transmitted by the transmitting device, the method comprises:

notifying, by the apparatus for defending against cyber-attacks, the receiving device of deleting an oldest keyword in the keyword set after a keyword of the transmitting device is updated to the new keyword.

* * * * *